R. H. HUBBELL.
PIPE CLEANING AND PAINTING MACHINE.
APPLICATION FILED MAY 27, 1915.

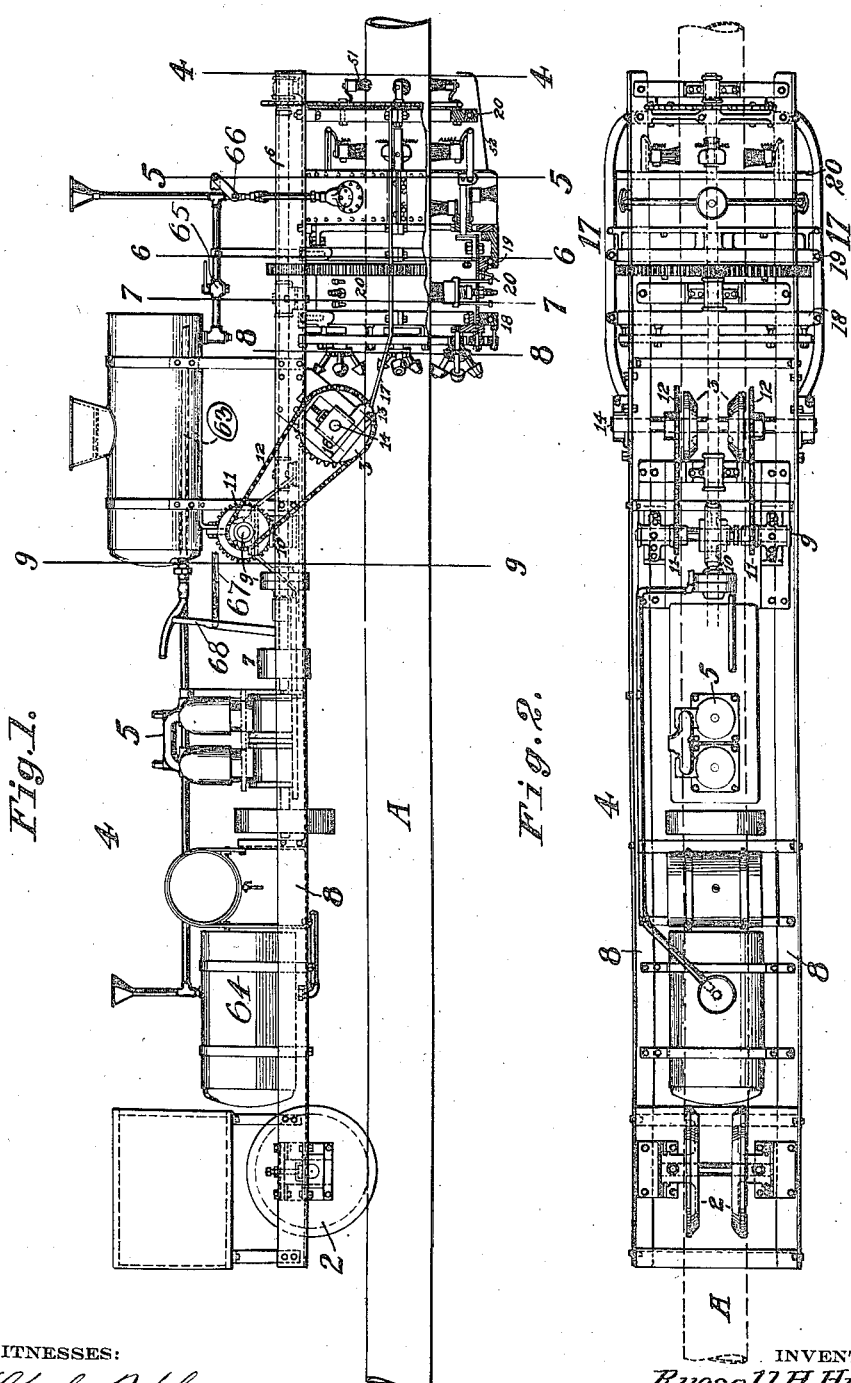

1,176,452.

Patented Mar. 21, 1916.
6 SHEETS—SHEET 2.

WITNESSES:
Charles Rickles
B. M. Doolin

INVENTOR
Russell H. Hubbell,
BY G. H. Strong.
ATTORNEY

R. H. HUBBELL.
PIPE CLEANING AND PAINTING MACHINE.
APPLICATION FILED MAY 27, 1915.

1,176,452.

Patented Mar. 21, 1916.
6 SHEETS—SHEET 3.

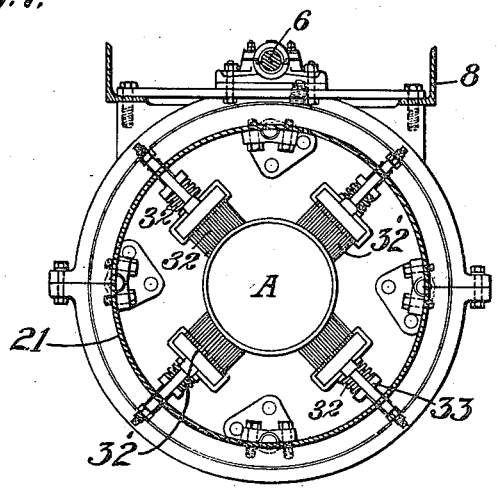
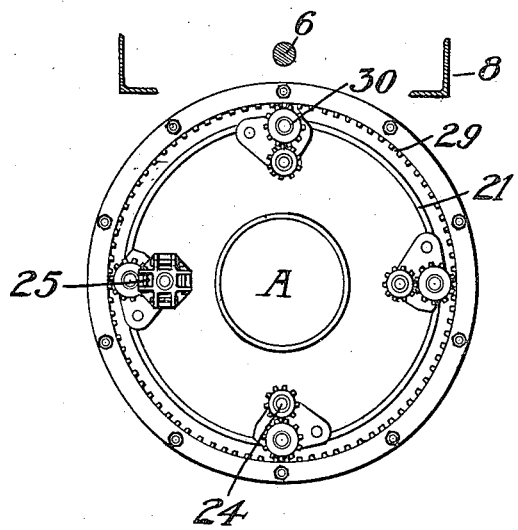

R. H. HUBBELL.
PIPE CLEANING AND PAINTING MACHINE.
APPLICATION FILED MAY 27, 1915.

1,176,452.

Patented Mar. 21, 1916.
6 SHEETS—SHEET 5.

WITNESSES:

INVENTOR
Russell H. Hubbell
BY G. H. Strong.
ATTORNEY

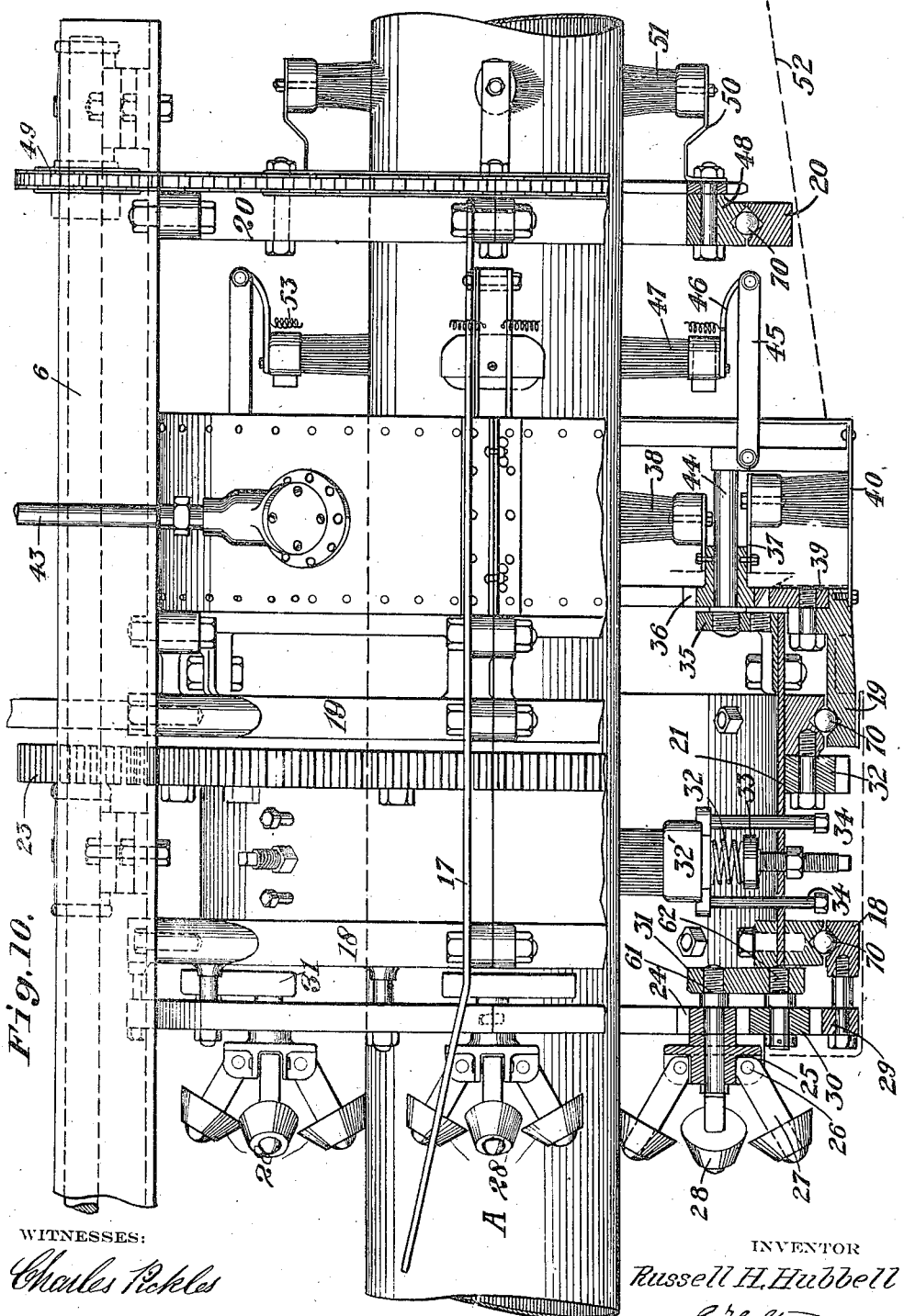

UNITED STATES PATENT OFFICE.

RUSSELL H. HUBBELL, OF SAN FRANCISCO, CALIFORNIA, ASSIGNOR TO HILL, HUBBELL & CO., OF SAN FRANCISCO, CALIFORNIA, A COPARTNERSHIP.

PIPE CLEANING AND PAINTING MACHINE.

1,176,452.  Specification of Letters Patent.  Patented Mar. 21, 1916.

Application filed May 27, 1915. Serial No. 30,826.

*To all whom it may concern:*

Be it known that I, RUSSELL H. HUBBELL, a citizen of the United States, residing in the city and county of San Francisco and State of California, have invented new and useful Improvements in Pipe Cleaning and Painting Machines, of which the following is a specification.

This invention relates to a pipe cleaning and painting machine.

One of the objects of the present invention is to provide a pipe cleaning and painting machine, and particularly a motor driven machine, which is adapted to travel over a continuous pipe line of indefinite length with the pipe as a track.

Another object of the invention is to provide means whereby power from the motor is transmitted to operate the cleaning and painting devices employed as the machine travels; and also to provide means for adjusting the machine as a whole to handle pipes of varying diameters.

Further objects will hereinafter appear.

The invention consists of the parts and the construction and combination of parts as hereinafter more fully described and claimed, having reference to the accompanying drawings, in which—

Figure 3:
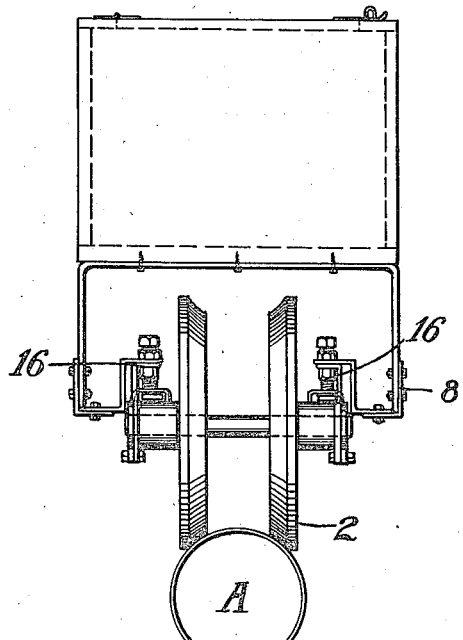
Figure 4:
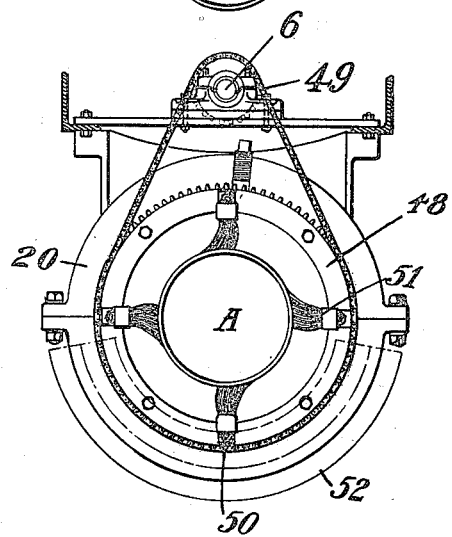
Figure 5:
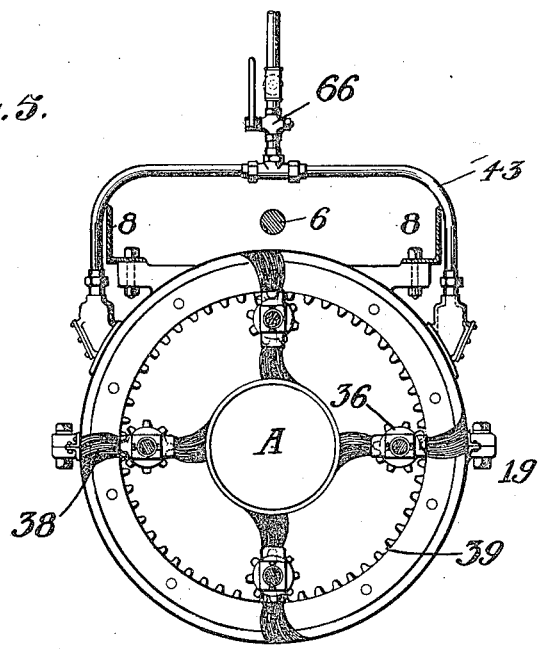
Figure 6:
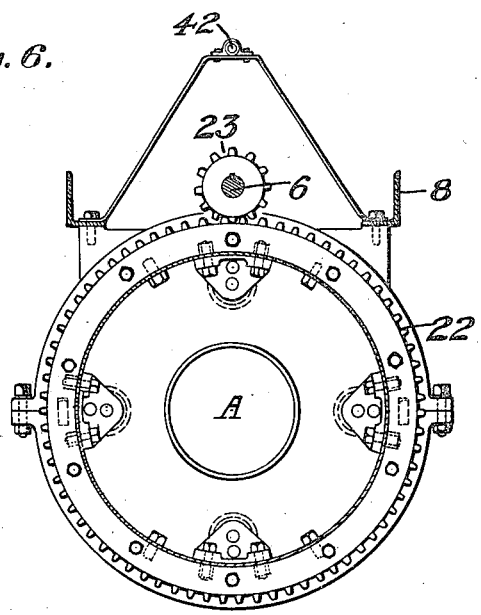
Figure 9:
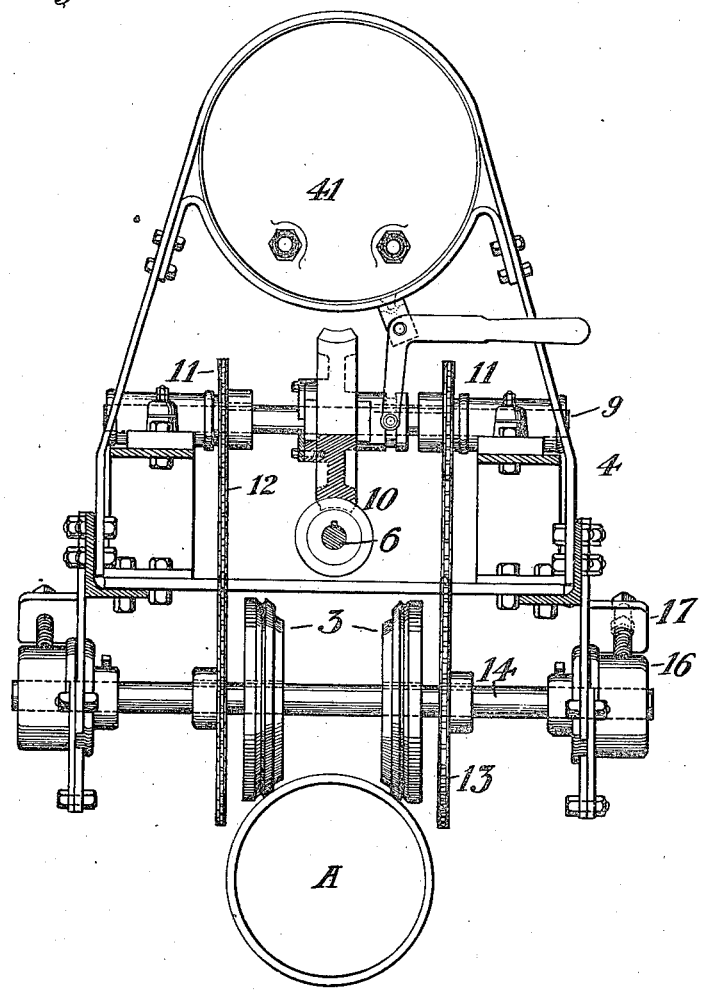

Figure 1 is a side elevation of the machine. Fig. 2 is a plan view of same. Fig. 3 is a front end view. Fig. 4 is a cross section on line 4—4 of Fig. 1. Fig. 5 is a cross section on line 5—5 of Fig. 1. Fig. 6 is a cross section on line 6—6 of Fig. 1. Fig. 7 is a cross section on line 7—7 of Fig. 1. Fig. 8 is a cross section on line 8—8 of Fig. 1. Fig. 9 is a cross section on line 9—9 of Fig. 1. Fig. 10 is an enlarged detail elevation of the rear end of the machine, partly in section.

A indicates the pipe line to be cleaned and painted. Adapted to be supported by wheels 2 and 3 on the pipe line and to travel along same as on a track is a carriage 4, in which is mounted a motor 5 from which power is transmitted to drive or propel the carriage in the following manner: 6 indicates a main drive shaft directly connected with the motor by means of a clutch 7. Journaled crosswise on the main frame 8 of the carriage, just above the main drive shaft, is a shaft 9 which is connected with the main shaft by means of the worm gear drive, indicated at 10, and secured on said shaft is a pair of sprocket wheels 11 from which power is transmitted, by chains 12, to a pair of sprocket wheels 13 secured on a shaft 14 upon which the rear carriage supporting wheels 3 are also secured. The flanges of the rear wheels 3 are preferably tapered to fit the contour of the pipe and in this manner provide a traction face which is sufficient to propel the carriage in a forward direction. Both the rear and forward supporting wheels of the carriage are adjustably mounted in bearing blocks, such as indicated at 15 and 16, for purposes hereinafter to be described.

Suspended from the rear end of the main frame 8 is a sub-frame 17 which is formed in two sections, one on each side of the main frame, and secured in said frame and also to the main frame 8 is a plurality of bearing rings, such as indicated at 18, 19 and 20. Journaled interiorly of the rings 18 and 19 is a drum 21 which is rotated from the main shaft 6 by means of a spur gear 22 secured exteriorly of the drum and engageable with a pinion 23 secured on the main drive shaft.

Mounted on the forward end of drum 21 is a plurality of pinions 24, and formed integrally with, or otherwise secured, to each pinion is a head member 25, in which is pivotally mounted, as at 26, a plurality of arms 27, on the outer end of each of which is journaled a conical-shaped roller 28.

Secured on the bearing ring 18 is a stationary internal spur gear 29, and engageable on one side with the internal gear 29 and on the other side with a pinion 24 is an intermediate pinion 30, one being provided for each pinion 24. The pinions 30 are secured and journaled on the forward plate 31 which is secured to drum 21 upon which pinions 24 are also secured and journaled. A rotary movement transmitted to drum 21, through pinion 23 and spur gear 22, will cause the pinions 24 to revolve at a high speed, as movement is transmitted to same through the stationary internal spur gear 29 and intermediate pinions 30. The high revolving speed transmitted to the pinions 24 while the main drum 21 is revolving at a comparatively slow speed will cause the pivoted arms 27 to swing out by centrifugal action, thus producing a hammer-like action on the pipe which not only removes and loosens any scale or rust formation on the surface of the pipe but also any other foreign matter which might be present.

Mounted interiorly of the revolving drum 21 is a plurality of radially disposed steel brushes 32′, the inner ends of which contact with the face of the pipe. Each brush is held against the pipe by a spring 32 interposed between the head of the brush and an adjustable bearing plate 33. The brushes are otherwise held in position by guide rods 34 projecting through openings formed in the drum 21. Practically any degree of pressure may be brought to bear on the brush by increasing or decreasing the tension of spring 32 and practically any size of pipe may be handled, as the brushes may be moved in or out in proportion to the diameter of the pipe handled. Any rust, scale or foreign matter not removed by the hammering action of the rollers 28 is scraped and brushed off by the brushes 31, the bristles of which are preferably constructed of stiff steel wire. The pipe is thus thoroughly cleaned before the paint is applied, as will hereinafter be described.

Secured and journaled on a plate 35 secured on the rear end of the drum is a plurality of pinions 36, and secured to the hub of each pinion 36 is a plurality of outwardly extending arms 37 of varying lengths, and suitably secured on the outer end of each of said arms is a paint brush 38. The pinions 36 are all so positioned as to intermesh with a stationary internal sprocket gear 39 which is secured to and carried by the bearing ring 19. Movement is in this manner transmitted from the revolving drum 21 to revolve the pinions 36, with connected brushes 38, at a suitable speed.

Secured to bearing ring 19, exteriorly of plate 35 and the internal sprocket gear 39, is an annular trough-shaped pan 40, and supplying said trough with paint, from a tank 41, is a pipe 42 which is branched, as at 43 and 44, to admit paint on each side of the trough. The paint admitted to the trough is picked up by the revolving brushes as these are carried around by the main revolving drum 21 and is in turn supplied to the face of the pipe, as the outer ends of the brushes are intermittently contacting with the pipe at one time and with the inner face of the trough at another time; the offset position or the varying lengths of the arms 37 permitting a considerable surface to be covered at one time.

Secured on the outer end of each stud 44, upon which the pinions 36 are journaled, is an extension arm 45, and pivotally mounted on the outer end of each of said arms is a brush supporting arm 46 in which is suitably secured a smoothing brush 47, one being provided for each arm. These brushes revolving in unison with the drum 21 are provided for the purpose of smoothing out the paint applied by the brushes 38. Mounted interiorly of the rearmost bearing ring 20 is a revolving ring 48 which is driven from the main shaft by means of the sprocket drive indicated at 49. Secured to this sprocket is a plurality of outwardly extending arms 50, and carried on the outer end of each arm and engageable with the face of the pipe is a finishing brush 51; the provision of the third or last set of brushes permitting the paint previously applied to be thoroughly smoothed and finished.

From the foregoing description it will be seen that the pipe is first thoroughly hammered, brushed or cleaned. The paint is then applied by the brushes 38, then smoothed out by the brushes 47, and finally finished off by the third and last set of brushes 51. The coat of paint is in this manner thoroughly applied and rubbed in and any surplus amount of paint applied is rubbed off by the smoothing and finishing brushes provided and is caught by a drip pan 52 which returns it to the main supply trough 40.

The pivotal mounting of the brush supporting arms 46 permits the several arms to be connected by coil springs, such as indicated at 53. This not only causes the several smoothing brushes to engage the pipe with equal pressure but also permits the arms to move in and out with relation to the surface of the pipe and permits pipes of varying diameters to be handled; the adjustable mounting of the brushes 31 being provided with the same object in view.

By referring to Fig. 5, it will be seen that the face plate 31 is provided with two stud support openings, such as indicated at 61 and 62. The studs upon which the pinions 24 are journaled may in this manner be moved radially inwardly or outwardly with relation to the center of the drum, permitting the pivoted hammers or rollers to be moved in or out into the most efficient position with relation to the diameter of the pipe handled.

By referring to Fig. 1, it will be seen that the paint tank is provided with an interior coil 63, one end of which is connected with the discharge outlet of the water circulating jacket on the edge 5. The heated water from the engine, before returning to the main cooling tank 64, is passed through the coil in the paint tank, causing the temperature of the paint to be raised to the desired temperature; the volume of paint admitted to the trough being controlled by a valve 65. A second valve 66 which may be termed the "automatic cut off valve" is also provided. This is connected by a link 67 with the main engine clutch lever 68 so that, when the clutch is thrown out to stop the carriage, the paint supplied through pipe 42 to the trough will be automatically cut off and prevents the paint from entering the trough and overflowing when the carriage and paint applying brushes are standing still.

The adjustable mounting of the main bearings 15 and 16 is provided for the purpose of maintaining the carriage at a fixed position with relation to the center of the pipe handled, thus maintaining the main revolving drum 21 and supporting bearing rings in a concentric position with relation to the pipe. Ball races, such as indicated at 70, are preferably interposed between the main bearing rings and the several revolving parts, such as the drum 21 and ring 48, thereby reducing friction to a minimum and permitting a free movement of the revolving parts.

The materials and finish of the several parts of the machine are otherwise such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A machine of the character described, comprising a carriage adapted to travel on a pipe as a track, a motor on the carriage adapted to drive the carriage on the pipe, and a pipe cleaning device mounted on the carriage.

2. A machine of the character described, comprising a motor-driven carriage adapted to travel on a pipe as a track, a pipe cleaning device mounted on the carriage, and means for driving the cleaning device from the motor while the carriage is traveling.

3. A machine of the character described, comprising a motor-driven carriage adapted to travel on a pipe as a track, a pipe cleaning device mounted on the carriage and surrounding the pipe, and driving means connected with the motor for operating the device.

4. A machine of the character described, comprising a motor-driven carriage adapted to travel on a pipe as a track, a bearing ring secured on the carriage and surrounding the pipe, a drum journaled in said ring also surrounding the pipe, a plurality of hammer-like members carried by the drum and engageable with the surface of the pipe, and means connected with the motor for revolving the drum.

5. A device of the character described, comprising a carriage, means for supporting and driving said carriage on a pipe, a revolving member mounted in the carriage and surrounding the pipe, cleaning members mounted in said revolving member engageable with the exterior surface of the pipe, and means for driving the revolving member.

6. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of centrifugally actuated hammers carried by each pinion engageable with the exterior surface of the pipe, and means for driving the revolving member.

7. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of centrifugally actuated hammers carried by each pinion engageable with the exterior surface of the pipe, means for driving the revolving member, and a plurality of cleaning members carried by the revolving member and engageable with the surface of the pipe.

8. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of centrifugally actuated hammers carried by each pinion engageable with the exterior surface of the pipe, means for driving the revolving member, a plurality of cleaning members carried by the revolving member and engageable with the surface of the pipe, said cleaning members comprising brushes radially disposed with relation to the revolving member and pipe, means for adjusting the position of the brushes radially, and means for increasing or decreasing the contact pressure of the brushes with relation to the pipe.

9. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of pivotally mounted arms carried by each pinion, a roller on the end of each arm engageable with the exterior surface of the pipe, and means for driving the revolving member.

10. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of pivotally mounted arms carried by each pinion, a roller on the end of each arm engageable with the exterior surface of the pipe, means for driving the revolving member, and a plurality of cleaning members carried by the revolving member and engageable with the surface of the pipe.

11. A device of the character described, comprising a carriage, means for supporting and driving said carriage on a pipe, a revolving member mounted in the carriage and surrounding the pipe, a plurality of pinions mounted on the revolving member, a stationary gear with which said pinions are engageable, a plurality of pivotally mounted arms carried by each pinion, a roller on the end of each arm engageable with the exterior surface of the pipe, means for driving the revolving member, a plurality of cleaning members carried by the revolving member and engageable with the surface of the pipe, said cleaning members comprising brushes radially disposed with relation to the revolving member and pipe, means for adjusting the position of the brushes radially, and means for increasing or descreasing the contact pressure of the brushes with relation to the pipe.

12. A device of the character described, comprising a carriage, means for supporting and driving said carriage on a pipe, a revolving member mounted in the carriage and surrounding the pipe, a plurality of brushes carried by the revolving member and engageable with the surface of the pipe, means for delivering paint to said brushes, and means for driving the revolving member.

13. A device of the character described, comprising a carriage, means for supporting and driving said carriage on a pipe, a revolving member mounted in the carriage and surrounding the pipe, a plurality of brushes mounted on the revolving member, means for revolving said brushes independently of the revolving member, a stationary trough inclosing the brushes, means for driving the revolving member, and means for supplying paint to the trough.

14. A device of the character described, comprising a carriage, means for supporting and driving said carriage on a pipe, a revolving member mounted in the carriage and surrounding the pipe, a plurality of brushes carried by the revolving member and engageable with the surface of the pipe, means for delivering paint to said brushes, means for driving the revolving member, means for preheating the paint, and means for regulating the quantity delivered.

15. A device of the character described, comprising a carriage, means for supporting and driving said carriage on a pipe, a revolving member mounted in the carriage and surrounding the pipe, a plurality of brushes mounted on the revolving member, means for revolving said brushes independently of the revolving member, a stationary trough inclosing the brushes, means for driving the revolving member, means for supplying paint to the trough, means for preheating the paint, and means for regulating the quantity delivered.

16. A device of the character described, comprising a carriage, means for supporting and driving said carriage on a pipe, a revolving member mounted in the carriage and surrounding the pipe, a stationary trough mounted on one side of the revolving member, a plurality of revolving brushes engageable with the interior of the trough and with the exterior surface of the pipe, said brushes being carried by the revolving member, means for driving the revolving member and the rotating brushes, a second set of smoothing brushes carried by the revolving member, and means for delivering paint to the trough.

17. A device of the character described, comprising a carriage, means for supporting and driving said carriage on a pipe, a revolving member mounted in the carriage and surrounding the pipe, a stationary trough mounted on one side of the revolving member, a plurality of revolving brushes engageable with the interior of the trough and with the exterior surface of the pipe, said brushes being carried by the revolving member, means for driving the revolving member and the rotating brushes, a second set of smoothing brushes carried by the revolving member, means for delivering paint to the trough, a second revolving member mounted in the carriage and surrounding the pipe, a plurality of finishing brushes secured on said revolving member, and means for driving said revolving member.

18. A device of the character described, comprising a carriage, means for supporting and driving said carriage on a pipe, a revolving member mounted in the carriage and surrounding the pipe, a stationary trough mounted on one side of the revolving member, a plurality of revolving brushes engageable with the interior of the trough and with the exterior surface of the pipe, said brushes being carried by the revolving member, means for driving the revolving member and the rotating brushes, a second set of smoothing brushes carried by the revolving member, means for delivering paint to the trough, means for collecting any surplus paint removed by the smoothing brushes, and means for returning said paint to the trough.

19. A device of the character described, comprising a carriage, means for supporting and driving said carriage on a pipe, a revolving member mounted in the carriage and surrounding the pipe, a stationary trough mounted on one side of the revolving member, a plurality of revolving brushes engageable with the interior of the trough and with the exterior surface of the pipe, said brushes being carried by the revolving member, means for driving the revolving member and the rotating brushes, a second set of smoothing brushes carried by the revolving member, means for delivering paint to the trough, a second revolving member mounted in the carriage and surrounding the pipe, a plurality of finishing brushes secured on said revolving member, means for driving said revolving member, means for collecting any surplus paint removed by the smoothing and finishing brushes, and means for returning said paint to the trough.

20. A device of the character described, comprising a carriage supported by wheels on the pipe to be cleaned and painted, a motor on said carriage, means for transmitting power from said motor to drive the carriage along the pipe as on a track, and means carried by the carriage for cleaning and painting the pipe.

21. A device of the character described, comprising a carriage supported by wheels on the pipe to be cleaned and painted, a motor on said carriage, means for transmitting power from said motor to drive the carriage along the pipe as on a track, means carried by the carriage for cleaning and painting the pipe, and means for transmitting power from the motor to operate said cleaning and painting means while the carriage is traveling.

22. A device of the character described, comprising a carriage supported by wheels on the pipe to be cleaned and painted, a motor on said carriage, means for transmitting power from said motor to drive the carriage along the pipe as on a track, bearing rings secured to the carriage and surrounding the pipe, a drum-like member journaled in said bearing rings and also surrounding the pipe, means carried by the drum for hammering the exterior surface of the pipe, means carried by the drum for brushing and cleaning the surface of the pipe after it has been hammered, and means for transmitting power from the motor to revolve the drum and to operate the hammers and cleaning brushes.

23. A device of the character described, comprising a carriage supported by wheels on the pipe to be cleaned and painted, a motor on said carriage, means for transmitting power from said motor to drive the carriage along the pipe as on a track, bearing rings secured to the carriage and surrounding the pipe, a drum-like member journaled in said bearing rings and also surrounding the pipe, means carried by the drum for hammering the exterior surface of the pipe, means carried by the drum for brushing and cleaning the surface of the pipe after it has been hammered, a plurality of paint brushes carried by the drum adapted to wipe the exterior surface of the pipe after the cleaning brushes have passed over the pipe, means for delivering paint to the brushes, and means for transmitting power from the motor to revolve the drum and to operate the hammers, cleaning brushes and paint brushes.

In testimony whereof I have hereunto set my hand in the presence of two subscribing witnesses.

RUSSELL H. HUBBELL.

Witnesses:
WALTER FEREM,
EDWARD JOEBNER.